July 4, 1939.　　　A. J. THOMPSON　　　2,164,846
MOUNTING DEVICE
Filed Nov. 6, 1936
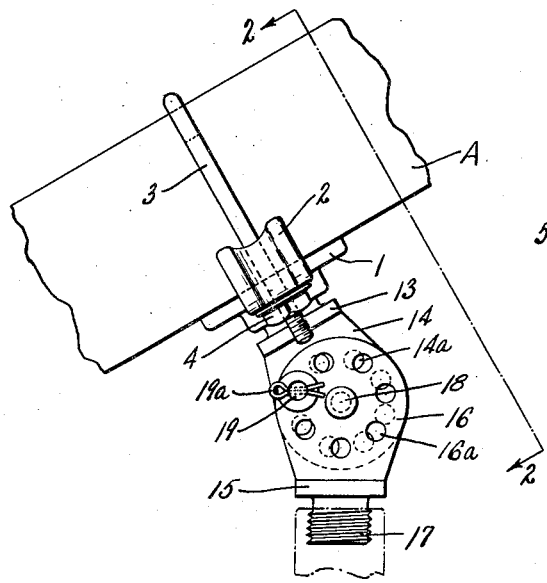
FIG. — 1
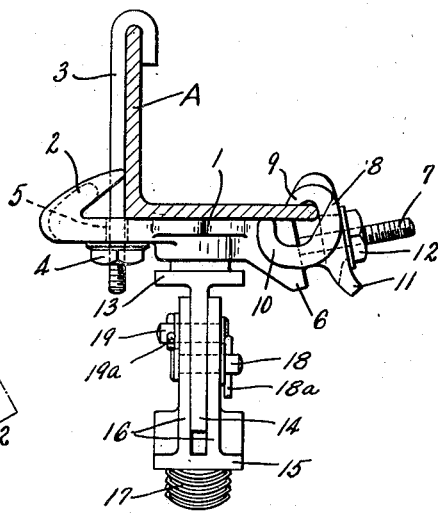
FIG. — 2
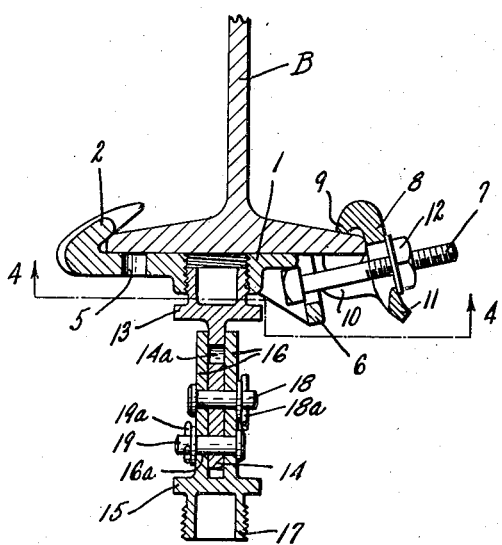
FIG. — 3
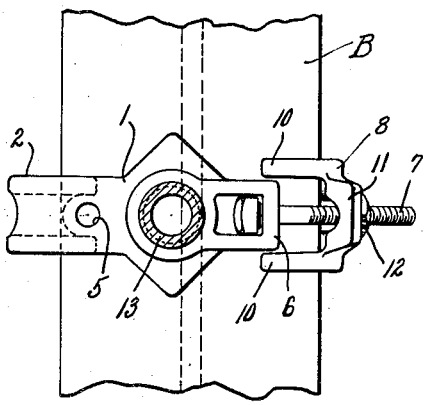
FIG. — 4
INVENTOR
ALLISON J. THOMPSON
BY
Brockett, Hyde, Higley & Meyer
ATTORNEYS Patented July 4, 1939

2,164,846

UNITED STATES PATENT OFFICE 2,164,846

MOUNTING DEVICE

Allison J. Thompson, Cleveland, Ohio, assignor to The Thompson Electric Company, a corporation of Ohio Application November 6, 1936, Serial No. 109,467

3 Claims. (Cl. 248—228)

This invention relates to fittings for mounting various devices such as lamp hangers, upon structural members of buildings such as the angle irons or I-beams of a steel mill building. The objects of the invention are to provide a fitting conveniently mountable upon such structural members, of different sizes, and without drilling holes in the members. Another object is to provide a fitting having articulated parts, including a supporting part attachable to the structural member which may be slopingly disposed, another adapted to support the device to be mounted, in plumb disposition, and a third, intermediate part, and the invention includes novel means for positively securing together the parts of the fitting in substantially any relation, to plumb the mounted device.

The exact nature of this invention together with further objects and advantages thereof will be apparent from the following description taken in connection with the accompanying drawing, which illustrates an embodiment of the invention and in which Fig. 1 is a side elevation of the fitting embodiment, showing it attached to a slopingly disposed angle iron; Fig. 2 is a sectional elevation as in the plane of line 2—2, Fig. 1; Fig. 3 shows the device as attached to an I-beam; Fig. 4 being a view of the same as in the plane of line 4—4, Fig. 3.

With reference now to the drawing, the upper part of the fitting includes a bracket member 1 having a face adapted to be disposed against the outer face of the lower leg of an angle iron A, the angle iron as illustrated being a typical structural member of uniform section such as produced by rolling. The bracket 1 at one end extends beyond the corner of the angle and is there provided with a hook part 2 whose extremity bears against the outer face of the other, upright, leg of the angle iron. A hook bolt 3, hooked over the upper edge of this upright leg, extends down through the bracket member and carries a nut 4. The bracket member has an opening 5 to receive the hook bolt, and the hook 2 of the bracket is bifurcated at its extremity, in line with the opening 5, to clear the hook bolt 3.

At its opposite end the bracket member 1 has a dependent portion 6 provided with a socket for receiving and securing the head of a bolt 7, and an opening to permit the shank of the bolt to extend from the bracket as illustrated. A C-clamp 8 is provided on the edge of the lower leg of the angle iron A, this C-clamp being generally of the form more particularly illustrated and described in my Patent No. 1,795,808 of March 10, 1931. Briefly, this C-clamp has an upper jaw member 9, engaging the upper face of the angle iron leg, a pair of lower jaw members 10 separated to provide clearance for the bracket member 1 therebetween, engaging the lower face of the leg, and a tail part 11 having an opening to receive the bolt 7 and faced to provide a seat for its nut 12.

It will be apparent that by tightening the nut 4 of the hook bolt 3, the hook end of the bracket will be firmly secured against the angle iron, and by tightening the nut 12 the C-clamp 8 is caused to firmly grip its leg of the angle iron, the hook 2 of the bracket is caused to firmly engage its leg of the angle iron, and the bracket is in short firmly clamped to the angle iron.

It will also be apparent that attachment may be had in generally similar manner to angle irons of different sizes from that illustrated. As to the upright leg, it is only necessary to provide a hook bolt 3 of suitable length. As to the lower leg, the C-clamp 8 is self-accommodating to grip its edge regardless of thickness of the leg, as more particularly described in my patent above identified. A longer bolt 7 than that illustrated may be employed if necessary.

Intermediate its ends the bracket 1 is provided with a threaded socket to receive a threaded shank part of a member 13, having a dependent circular head 14. A member 15 generally of clevis form has a circular head 16 bifurcated to receive the head 14 between its halves, the member 15 having a shank part 17 of any convenient form suitable for connection with the device to be mounted and here shown as threaded for that purpose. The heads 14 and 16 are pivotally connected for relative adjustment about their common axis as by a pin 18 positioned in central openings in the heads and there secured as by a cotter pin 18a.

For positive securement of these heads in adjusted positions, each is provided with a circular series of openings, upon a common radius from the axis. These openings are preferably all of the same size, uniformly spaced about the axis in each member, and there are slightly more openings in one than in the other. Thus in the drawing the head 14 is provided with eight openings 14a and the head 16 with seven openings 16a. By the arrangement described different pairs of these openings, one of each head, will be aligned in different adjusted positions of the parts about their axis pin 18, a very slight adjustment between the heads serving to change the openings which are aligned as a pair. A pin 19 removably positionable in any aligned pair of openings, is provided, conveniently secured as by a cotter pin 19a, for positively locking the heads together in any adjusted position.

Figs. 3 and 4 show the device applied to an I-beam B, the hook part 2 of the bracket 1 engaging one of the lower flanges of the beam, and the clamp 8 engaging the opposite flange, the hook bolt being unnecessary. The jaw of the hook 2 is longer than necessary for engagement of the beam illustrated so that it will be engageable with the flange of a much large beam, and the angle of the hook is such that it will always engage the upper corner of the beam flange regardless of the size of the beam, so as to seat the bracket against the face of the beam. As already described in connection with the angle iron A, the C-clamp 8 is self-adapting to various flange thicknesses, and a longer bolt 7 may be employed if the size of beam demands.

The universal features of the fitting are to be noted. As already described, the fitting may be mounted upon structural members of either angle iron or I-beam form and on different sizes of either, and by suitable tightening of its bolt nut or nuts will firmly grip the latter when mounted. The threaded connection between the bracket 1 and the intermediate member 13 provides a swivelling relation in the plane of the structural member, and the described adjustment about the pin 18 provides for plumbing of the member 15 about a transverse axis, so that regardless of disposition of the structural member the member 15 may be secured plumbed. Its positive securement in adjusted position with the intermediate member 13 will serve to maintain the latter against rotation upon the bracket 1 the more slopingly the latter is disposed.

What I claim is:

1. A fitting of the class described comprising a bracket adapted to be disposed against a leg of an angle iron, extending transversely therebeyond and there having a hook engaging the other angle iron leg, said bracket having an opening adjacent said hook, a hook bolt extending through said opening for transverse bearing against said second leg and engagement with its edge, said hook being bifurcated to provide clearance for said bolt, and means engageable with the opposite edge of said first leg for securing the corresponding end of said bracket.

2. A fitting of the class described comprising a bracket having a bifurcated hook at one end and an opening aligned with that of said hook, and threadedly adjustable means at the opposite end of said bracket adapted for engagement with a flange edge part of a structural iron member.

3. A suspension fitting of the class described comprising a bracket having a plane face for engagement with the flat face of different structural iron members such as angles or I-beams, said bracket carrying at one end adjustable clamping means adapted to engage an edge of said structural member, said bracket having at its other end a hook extending above said plane face and toward said clamping means in position to engage the flange edge of an I-beam or the outer face of an angle leg, and there being an opening in the hook end of said bracket through which securing means may be passed to hold said hook end of said bracket against the leg of an angle beam.

ALLISON J. THOMPSON.